(12) United States Patent  
Tan et al.

(10) Patent No.: US 9,294,597 B2  
(45) Date of Patent: Mar. 22, 2016

(54) APPARATUSES AND METHODS FOR A FLEXIBLE DISPLAY ON A MOBILE DEVICE

(71) Applicant: FutureWei Technologies, Inc., Plano, TX (US)

(72) Inventors: Hui Tan, San Diego, CA (US); Kiran Vanjani, San Diego, CA (US); Jorge Fabrega Sanchez, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 79 days.

(21) Appl. No.: 14/163,317

(22) Filed: Jan. 24, 2014

(65) Prior Publication Data

US 2014/0213324 A1    Jul. 31, 2014

Related U.S. Application Data

(60) Provisional application No. 61/756,964, filed on Jan. 25, 2013, provisional application No. 61/761,514, filed on Feb. 6, 2013.

(51) Int. Cl.
*H04M 1/02* (2006.01)
*G06F 1/16* (2006.01)

(52) U.S. Cl.
CPC ........... *H04M 1/0268* (2013.01); *G06F 1/1652* (2013.01); *G06F 1/1677* (2013.01); *H04M 1/0216* (2013.01); *G06F 1/1681* (2013.01); *H04M 1/0214* (2013.01)

(58) Field of Classification Search
None
See application file for complete search history.

(56) References Cited

U.S. PATENT DOCUMENTS

| | | | |
|---|---|---|---|
| 2004/0244146 A1* | 12/2004 | Park | 16/239 |
| 2007/0019804 A1* | 1/2007 | Kramer | 379/433.13 |
| 2010/0275413 A1* | 11/2010 | Kim | 16/303 |
| 2011/0179864 A1* | 7/2011 | Raasch et al. | 73/493 |
| 2013/0010405 A1* | 1/2013 | Rothkopf et al. | 361/679.01 |

* cited by examiner

*Primary Examiner* — King Poon  
*Assistant Examiner* — Vincent Peren  
(74) *Attorney, Agent, or Firm* — Slater & Matsil, L.L.P.

(57) ABSTRACT

Embodiments are provided for mobile phones, and similar sized electronics devices, with flexible displays, which allow suitable viewing sizes for different applications. The embodiment devices combine, into one compact package, the benefits of a small carry size with those of a large display. An embodiment mobile phone with a flexible display includes a first part having a first surface and a first edge, and a second part having a second surface and a second edge. A rotatable hinge couples the first edge of the first part is coupled to the second edge of the second part. The flexible display of the mobile phone is a continuous flexible display which has a back surface disposed on the first surface of the first part and on the second surface of the second part. The viewing surface of the flexible display is opposite to the back surface.

20 Claims, 12 Drawing Sheets

APPARATUSES AND METHODS FOR A FLEXIBLE DISPLAY ON A MOBILE DEVICE

This application claims the benefit of U.S. Provisional Application No. 61/756,964 filed on Jan. 25, 2013 by Hui Tan et al. and entitled "Systems and Method for a Flexible Display on a Mobile Phone," and U.S. Provisional Application No. 61/761,514 filed on Feb. 6, 2013 by Hui Tan et al. and entitled "Systems and Method for a Flexible Display on a Mobile Phone," which are hereby incorporated herein by reference as if reproduced in their entirety.

TECHNICAL FIELD

The present invention relates to the field of mobile electronics devices, and, in particular embodiments, to apparatuses and methods for a flexible display on a mobile phone.

BACKGROUND

Mobile electronics devices, such as mobile phones, have small rigid displays. The displays of small mobile phones generally are too small for viewing a variety of material, and for performing a variety of tasks. Currently, flexible display technology is gaining interest in the mobile phone industry. A flexible display is a display which is flexible in nature, in contrast to the more prevalent traditional flat screen displays currently used in different electronics devices. In the recent years there has been a growing interest from numerous consumer electronics manufacturers to apply this display technology in e-readers, mobile phones and other consumer electronics. Different technologies can be used to generate such displays. Material and technology constraints still present challenges for using such displays in mobile phones. Currently, original equipment manufacturers (OEMs) are testing the market in terms of display sizes. For example, a 3.5" display is considered a suitable size for carrying devices around with ease. On the other hand, the 3.5" size is a constraint on gaming and other high-end video applications. Users generally prefer a 5.0" or greater display size for such applications. There is a need for mobile phones, or similar sized electronics devices, that take advantage of flexible display technology and provide suitable viewing sizes for different applications.

SUMMARY OF THE INVENTION

In accordance with an embodiment, a mobile phone with a flexible display comprises a first part having a first surface and a first edge, and a second part having a second surface and a second edge. The mobile phone further comprises a rotatable hinge that couples the first edge of the first part to the second edge of the second part. The flexible display of the mobile phone is a continuous flexible display which has a back surface disposed on the first surface of the first part and on the second surface of the second part. The viewing surface of the flexible display is opposite to the back surface on the first surface of the first part and the second surface of the second part.

In accordance with another embodiment, a mobile phone with a flexible display includes a first part having a first surface and a first edge and a second part having a second surface and a second edge. The mobile phone further includes a link hinge expandable from second edge of the second part, and pluggable into the first edge of the first part. The flexible display is a continuous flexible display having a back surface disposed on the first surface of the first part and on the second surface of the second part. The flexible surface has a viewing display opposite to the back surface.

In accordance with another embodiment, a method of manufacturing a mobile phone with a flexible display includes forming a first body section having a first main surface and a first edge, and forming a second body section having a second main surface and a second edge. The first edge of the first body section is coupled to the second edge of the second body section via a rotatable hinge or a link hinge. The method further includes attaching a back surface of a continuous flexible display to the first main surface of the first body section and to the second main surface of the second body section. The display has a viewing surface opposite the back surface.

In accordance with yet another embodiment, a method by a user for operating a mobile phone includes folding, via a rotatable hinge based on a cam mechanism or a link hinge, a continuous flexible display placed on a first part and a second part of the mobile phone at an angle within a range of angles from about 0 degree to at least 270 degrees. The angle is locked via the rotatable hinge or the link hinge. The mobile phone is then operated at an operation mode according to the angle between the first part and the second part.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for mobile phones, and similar sized electronics devices, which allow suitable viewing sizes for different applications using flexible display technology. The embodiment devices combine, into one compact package, the benefits of a small carry size with those of a large display. Specifically, the device designs herein incorporate a flexible display on a mobile phone (or a similar size electronics device) that is flexible and foldable. The display can bent to a desired angle using movements of hinges that connect two frames of the device. Two embodiments for the hinges are provided: a rotatable hinge based on a cam mechanism and a link hinge. Both hinges allow folding the two frames and the flexible display to lock at one of a wide range of discrete or finite angles. For instance, if the angle between the frames is locked to 180 degrees (°), the display becomes flat providing a full size or wide screen size view. If the two frames are rotated to face each other such that the surfaces of the two frames are in contact (the frames are folded on each other), the display is bent to wrap around the two frames providing a double view on both sides of the frames. As such, the size view is about half the full size wide screen view, but the device becomes more compact in size. If the angle between the frames is locked at or close to 90°, the screen is bent into essentially a flattened (bottom) section and an erected (front) section, e.g., similar to a laptop form. The flattened part can be operated as a touch screen. Details of the embodiments and methods for operating and assembling the devices are described below.

Figure 1:
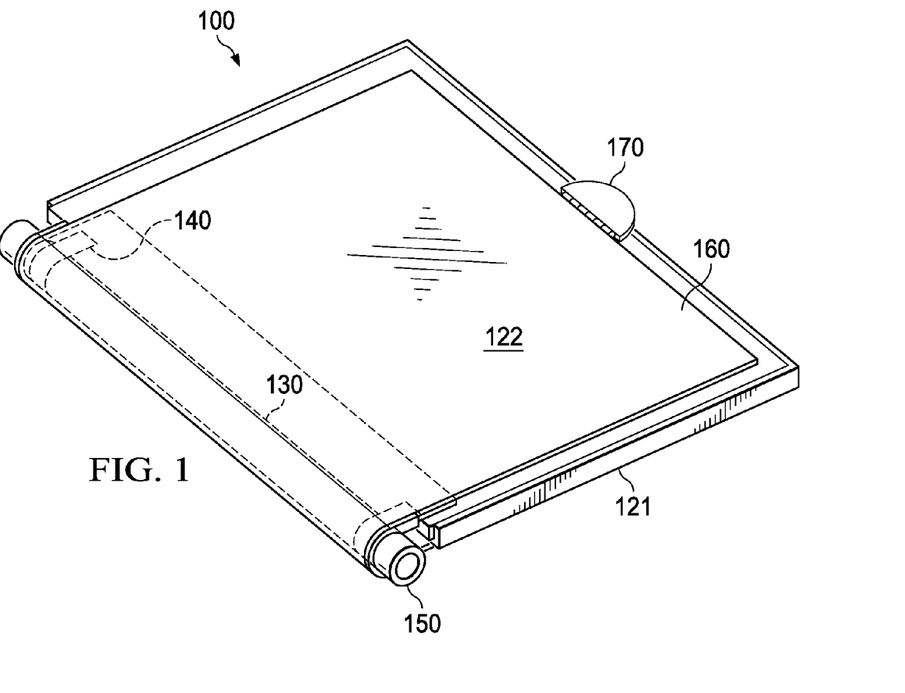
FIG. 1 is an isometric view of an embodiment mobile phone with a flexible display screen.

FIG. 1 shows an embodiment mobile phone 100 with a flexible display screen (not shown). The mobile phone 100 includes a first frame or part 121 and a second frame or part 122 that are coupled to each other at their edges via a shaft 130 with rotatable hinges 150 on both ends of the shaft. The parts 121 and 122 can be essentially plastic frames, aluminum frames or made of other suitable materials. The parts 121 and 122 can be of different sizes or the same size. For instance, the first part 121 is larger in size than the second part 122 and holds the device electronics, battery, power components, or other components. The second pat 121 may also hold electronics or other components for operating the device, such as antennas. The rotatable hinges 150 are based on a cam mechanism that allows folding the two parts 121 and 122 at variable rotation angles. The rotatable hinges 150 also allow the locking of the positions of the two parts 121 and 122 at any one of multiple finite angles in a range of available angels. The frames 121 and 122 can be folded with respect to one another and locked at discrete angle increments in the available angle range as provided by the rotatable hinges 150.

The first part 121 serves as a display cover which holds the flexible display around the edges and protects the edges of the display on that end. The second part 122 also serves as a display holder which supports and protects the flexible display on that end. A flexible protective cover 160, which is bendable with the display, is placed on the shaft 130. The flexible protective cover 160 provides support and protection to the flexible display at the region between the two parts 121 and 122. The flexible protective cover 160 is molded to the second part 122 and to the first part 121. The flexible display is placed on and extends over the first part 121, the flexible protective cover 160, and the second part 122. Additionally, strip springs 140 are embedded inside the flexible protective cover 160 (or between the flexible protective cover 160 and the shaft 130), at opposite ends of the flexible protective cover 160, e.g., on top of the rotatable hinges 150 in the shaft 130. The strip springs 140 operate in combination with the cam mechanism of the rotatable hinges 150 to provide smooth and controlled angle positioning between the two parts 121 and 122. A fastener 170 is connected to the second part 122 at the edge opposite to the shaft 130. The fastener 170 allows the fastening and releasing of the second part 122 with the first part 121. For instance, the fastener includes a lock and release button and a latch. Alternative fastening and release means can also be used.

Figure 2:
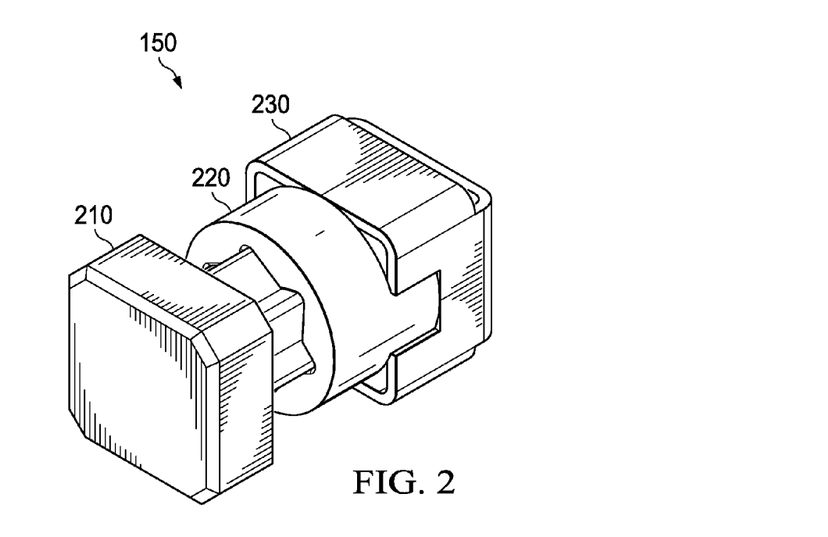
FIG. 2 is an isometric view of an embodiment of a rotatable hinge based on a cam mechanism.
Figures 3, 4:
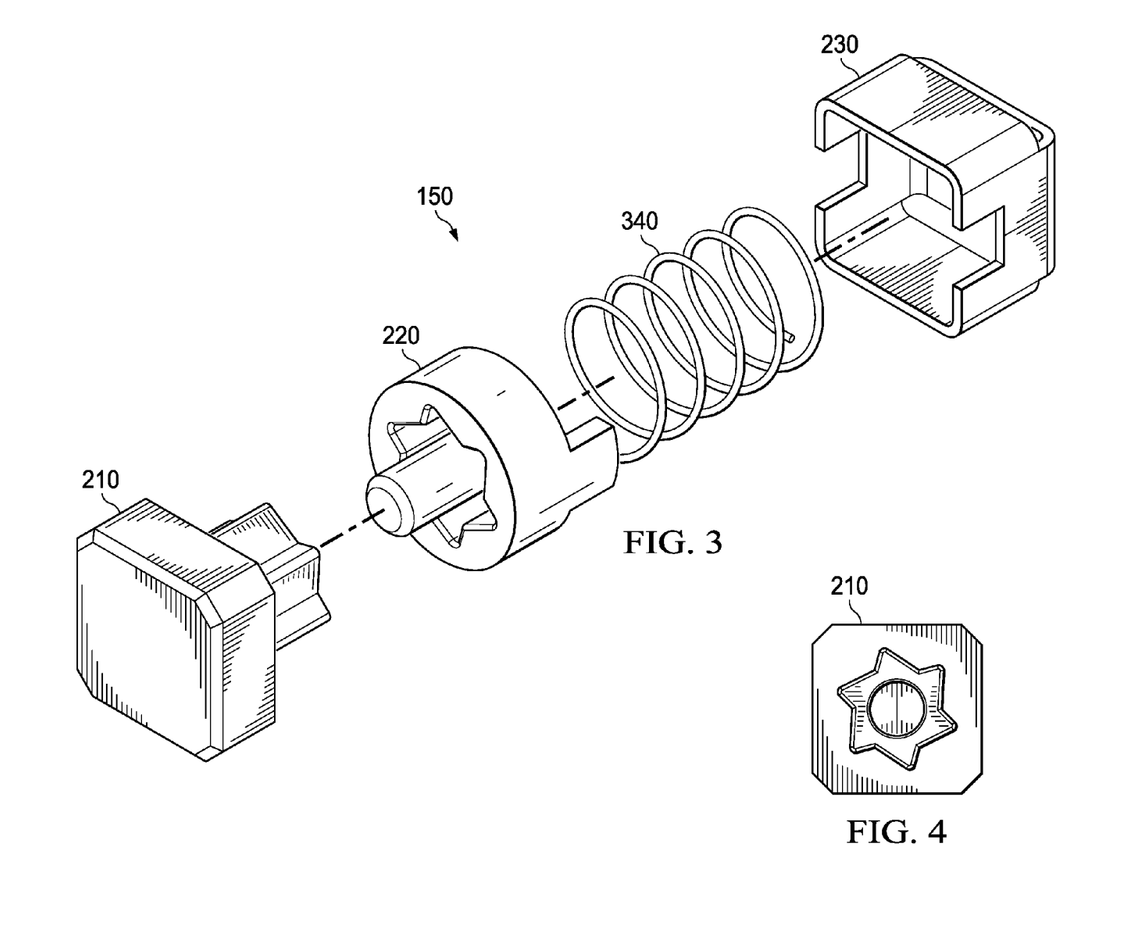
FIG. 3 is an exploded view of the rotatable hinge of FIG. 2.
FIG. 4 is a top view of a hinge head that is part of the rotatable hinge of FIG. 2.

FIGS. 2 and 3 show an embodiment of a rotatable hinge 150 based on a cam mechanism. The rotatable hinge 150 includes a hinge head 210, a spring holder 230, and a rotatable part 220 positioned between the hinge head 210 and the spring holder 230. The spring holder 230 holds a spring 340 that is connected to the rotatable part 220. Specifically, the hinge head 210 and the spring holder 230 are fixed within the shaft 130 with respect to the first part 121. However, the rotatable part 220 rotates as the second part 122 is manually folded to a chosen angle with respect to the first part 121. This rotation generates a torque by the spring 340 and the strip springs 140 on the rotatable part 230, which provides a controlled and smooth rotation.

Figure 5:
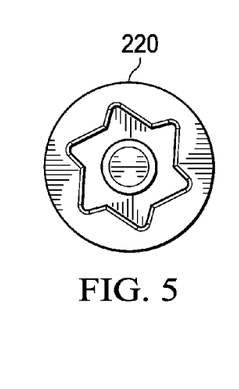
FIG. 5 is a top view of a rotatable part of the hinge of FIG. 2.

FIGS. 4 and 5 show top and facing views of the hinge head 210 and the rotatable part 220. The hinge head 210 protrudes into a socket within the rotatable part 220. Both the protrusion and the socket include multiple teeth distributed at equal discrete angles around the circumferences of the protrusion and the socket (in a complete angular range of 360°). As such, the teeth form a star like geometry. For example, as shown in FIGS. 4 and 5, the protrusion and socket have essentially and hexagram shape with a total of six teeth, which determine the angular increments (angular resolution). The teeth may not be symmetrical but slightly slanted or skewed to allow the locking of the rotatable part 220 onto the fixed hinge head 210.

When the two parts 121 and 122 are fully folded on each other, by the hinge cam mechanism, the flexible display folds accordingly and wraps around the surfaces of the two parts 121 and 122. Thus, the flexible display allows viewing on both opposite outer (exposed) surfaces of the mobile phone 100. The mobile phone 100 also has a compact size in this case. In an embodiment, when the parts 121 and 122 are folded on each other, the second part 122 becomes embedded in the first part 121 such that the second part 122 does not protrude beyond the frame of the first part 121. This provides a more compact form for the mobile phone 100.

The design of the rotatable hinges 150 allows rotation in a range from about 0° to more than about 270°. At about 0°, the two parts 121 and 122 are folded on each other as in FIG. 1. When the angle between the two frames 121 and 122 is rotated, using the hinge mechanism, up to 180 degrees (°), the flexible display is extended to a full size view. As such, the mobile phone 100 can be used similar to a tablet, which is convenient for reading or web surfing. The angle can be rotated beyond the 180° to fold the screen on itself, thus allowing a curved display view. For example, when the angle is rotated at about 270°, the flexible display can be folded close to or at 90°, where the erected frame of the screen can operate as a display and the flattened frame (or a portion of it) can operate as a touch keyboard. As such, the mobile phone 100 can be used similar to a laptop, which is convenient for typing.

Figure 6A:
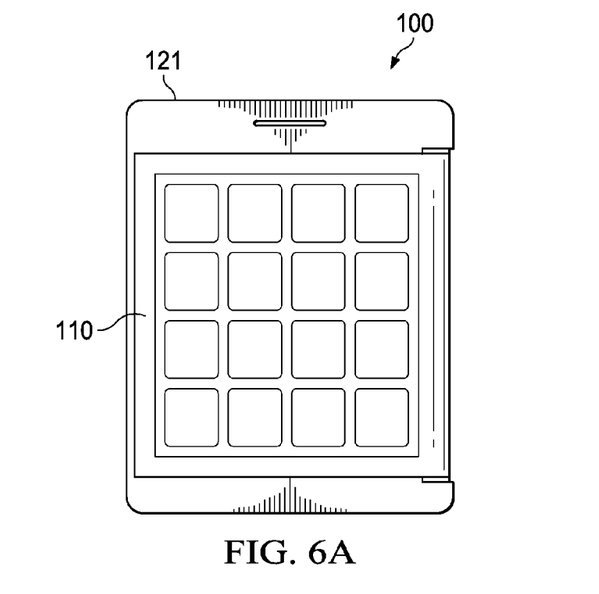
FIGS. 6A and 6B are front and back views of the mobile phone of FIG. 1.
Figure 6B:
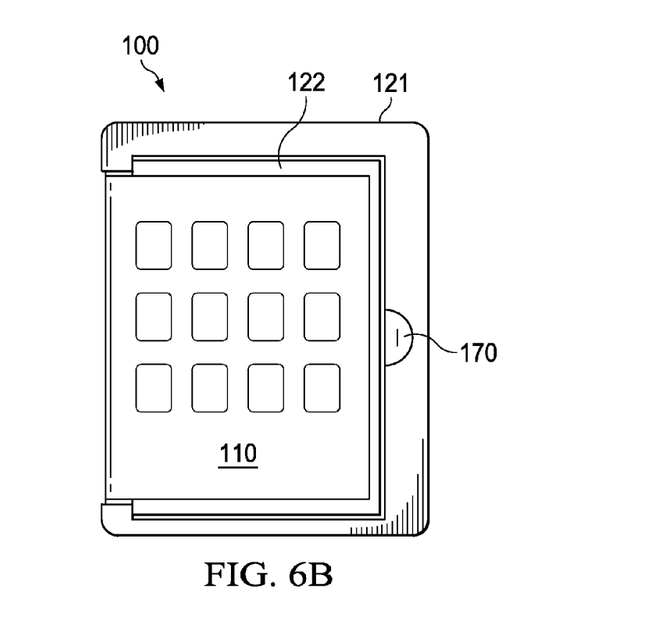

FIGS. 6A and 6B are front and back views of the mobile phone 100. The front view shows a portion of the flexible display 110 on the first part 121. The back view shows the opposite side of the mobile phone 100, which includes another portion of the flexible display 110 on the second part 122, and the release button 170.

Figure 7A:
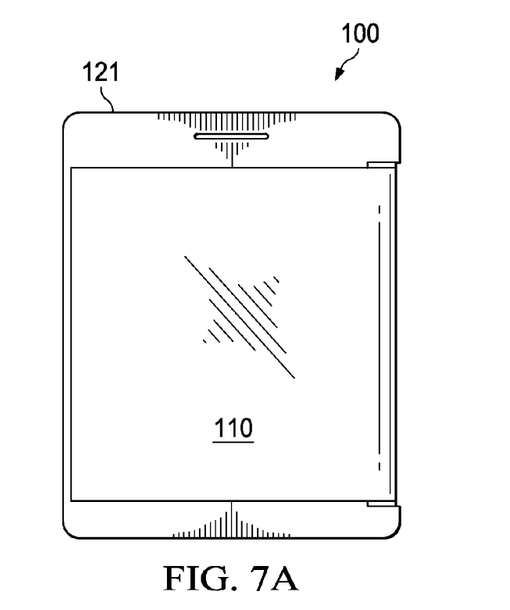
FIGS. 7A and 7B are top views of the mobile phone of FIG. 1 in different operation modes.
Figure 7B:
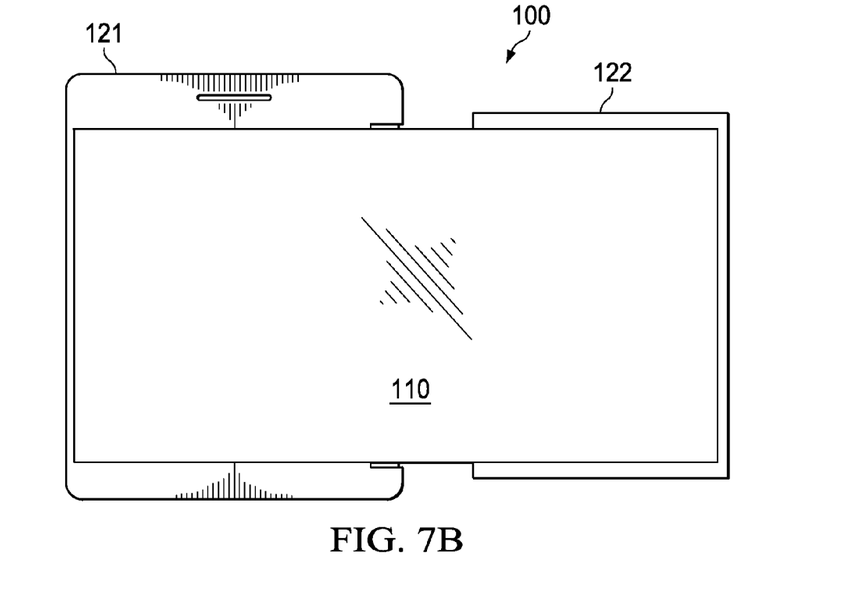
Figure 8:
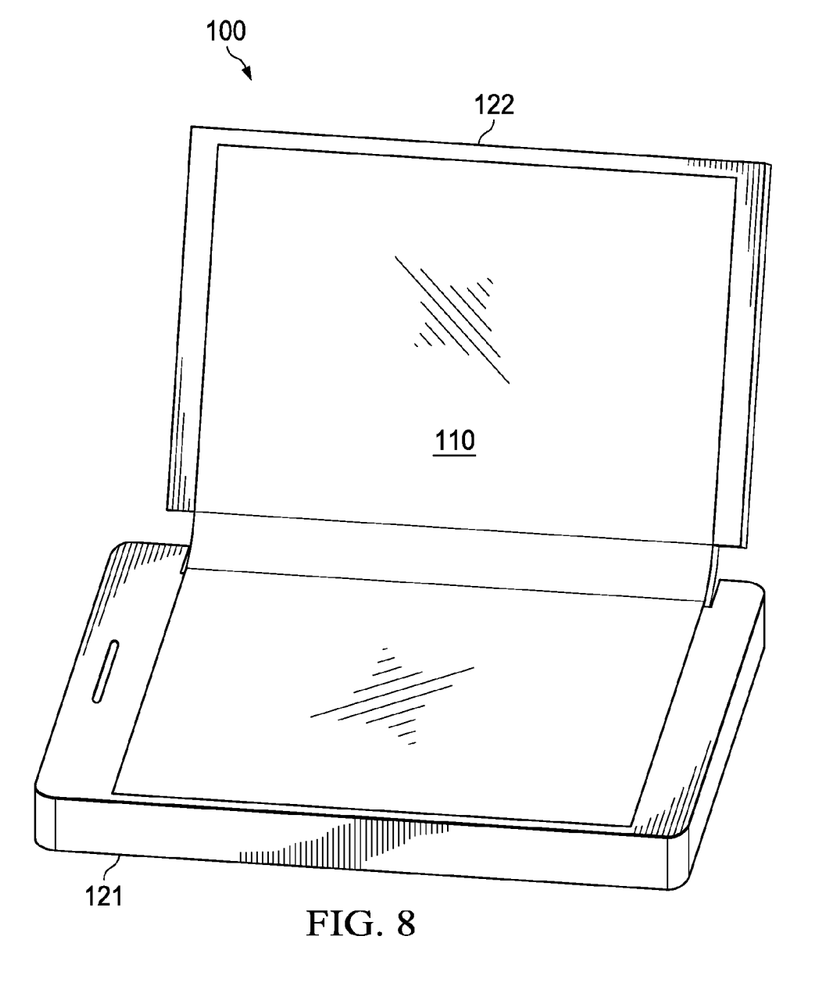
FIG. 8 is an isometric view of the mobile phone of FIG. 1 in yet another operation mode.

FIGS. 7A and 7B show different operation modes of the mobile phone 100. In FIG. 7A, the two parts 121 and 122 (not shown) are folded onto each other. The mobile phone 100 has a compact format and either sides of the flexible display 110 can be used. In FIG. 7B, the flexible display 110 is unfolded to 180° between the two parts 121 and 122, which offers the widest and largest size view possible. FIG. 8 shows yet another operation mode of the mobile phone 100. In this case, the flexible display 110 is folded at a less than 180°, e.g., close to a 90°, which is suitable for typing. In an embodiment, the mobile phone's operating system detects the rotation angle and automatically selects a suitable operation mode. For instance, when the two parts 121 and 122 are folded on each other (as in FIG. 7a), the mobile phone 100 automatically switches to a "phone" mode. In this mode, at least one of the portions of the flexible display 110, on one side of the folded mobile phone 100, displays phone functions (e.g., dial pad, date, time, weather, cellular/WiFi signal strength). When the flexible display 110 is unfolded to 180°, the mobile phone 100 switches to a "tablet" mode. In this mode, the flexible display 110 displays widgets or mobile apps. When the flexible display 110 is folded on itself at less than 180°, the mobile phone 100 switches to a "laptop" mode. In this mode, the bottom section of the flexible display 110 (e.g., on the first part 121) displays a touch keyboard.

Figure 9:
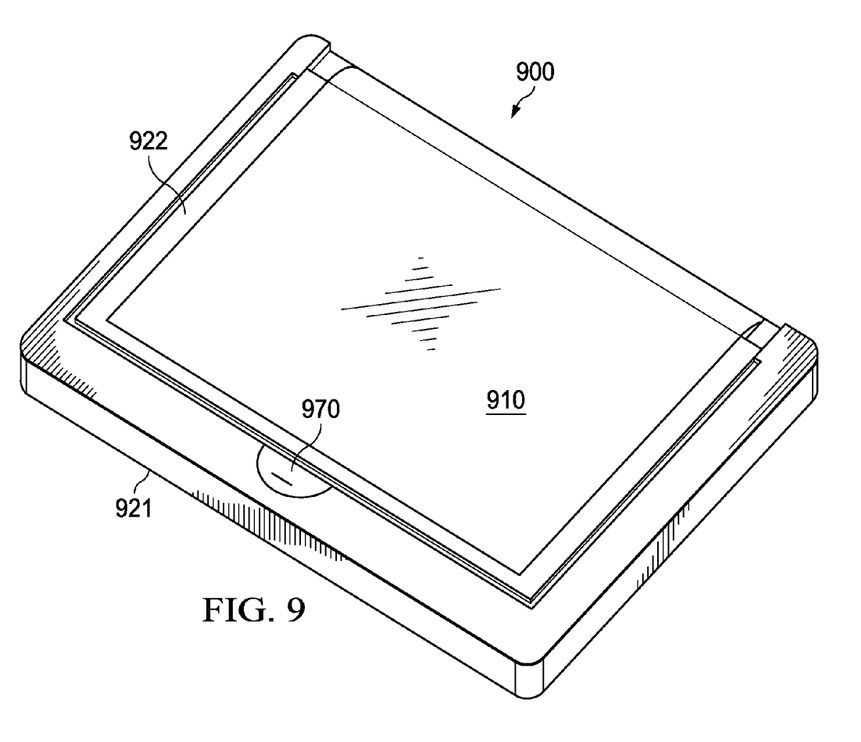
FIG. 9 is an isometric view of another embodiment mobile phone with a flexible display screen.

FIG. 9 shows another embodiment of a mobile phone 900 with a flexible display screen. The mobile phone 900 includes similar components as the mobile phone 100. Specifically, the mobile phone 900 includes a first part 921 and a second part 922. The parts 921 and 922 are similar to the corresponding pasts 121 and 122. For instance, the first part 921 is larger in size than the second part 922 and holds all or more electronics components, power components, and battery. A flexible display 910 is placed and extends over both parts 921 and 922. A fastener 970 is also connected to the second part 922 on one edge, and allows fastening and releasing the second part 922 with the first part 921.

Figure 10:
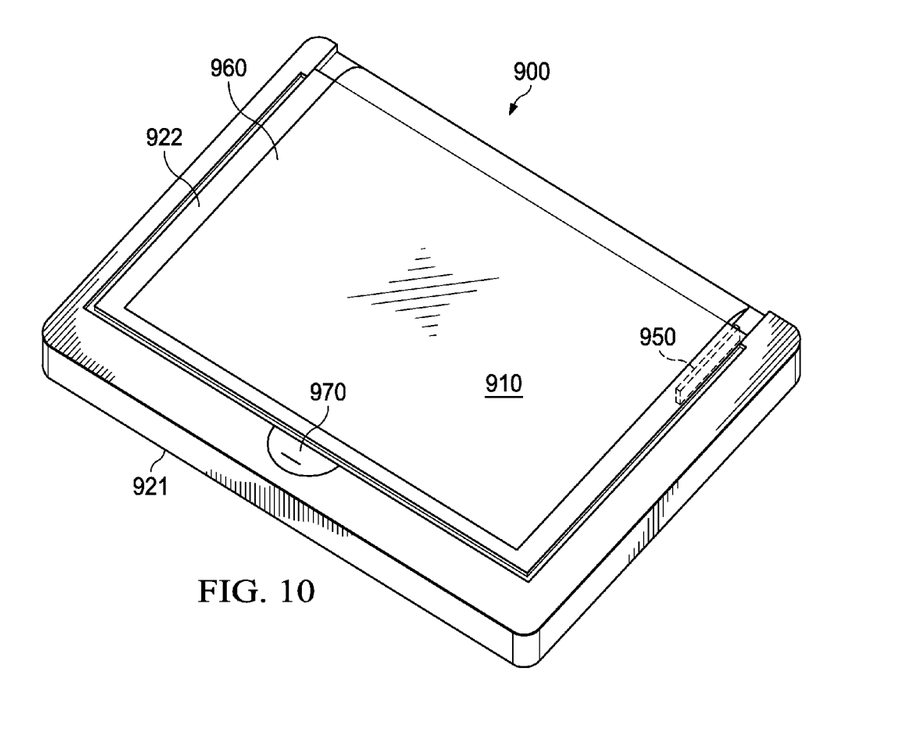
FIG. 10 is an isometric view of components of the mobile phone of FIG. 9.

FIG. 10 shows further components of the mobile phone 900. The components include link hinges 950 on both edges of the second part 922. The components also include a flexible protective cover 960, which is molded to sections of the second part 122 and the first part 121. The flexible display (not shown) is placed on both parts 921 and 922 and the flexible protective cover 960 between them. The flexible protective cover 960 is bendable with the flexible display and provides support and protection to the flexible display at the region between the two parts 921 and 922. Unlike the mobile phone 100, the mobile phone 900 does not include a shaft between the two parts 921 and 922. Instead the two parts 921 and 922 are coupled to each other via the flexible protective cover 960 and the flexible display. The link hinges 950 are embedded in the second part 922 when the parts 922 and 921 are folded on each other as shown in FIG. 10.

Figure 11A:
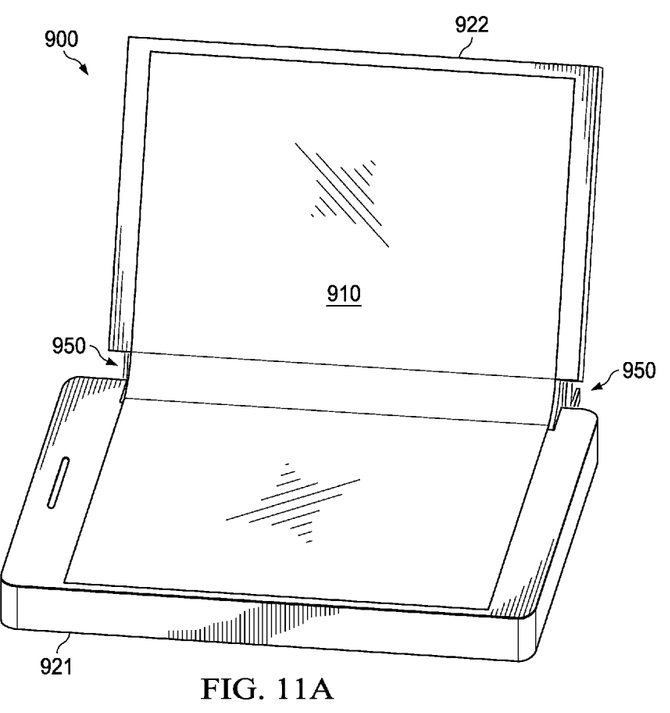
FIGS. 11A and 11B are isometric front and back views of the mobile phone of FIG. 9.
Figure 11B:
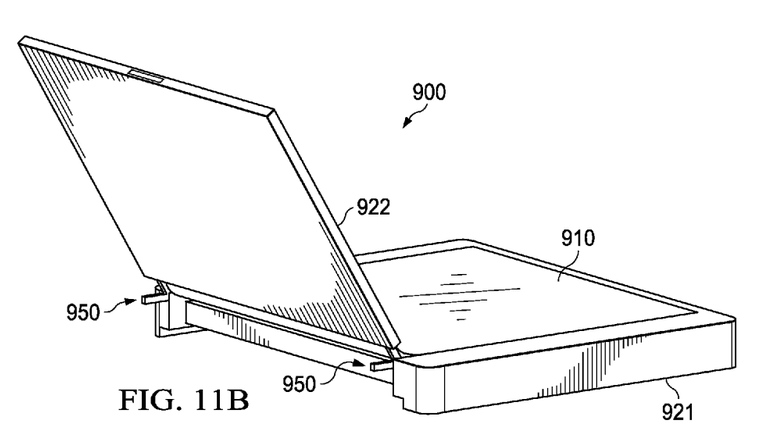
Figure 12:
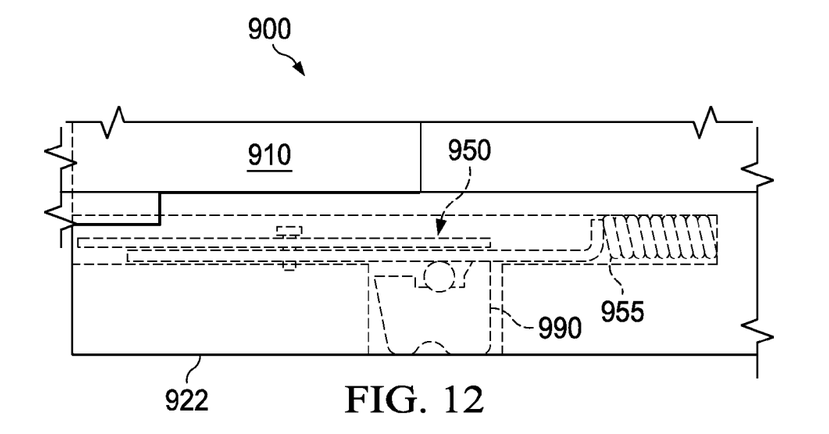
FIG. 12 is a side view of a section of the mobile phone of FIG. 9.
Figure 13:
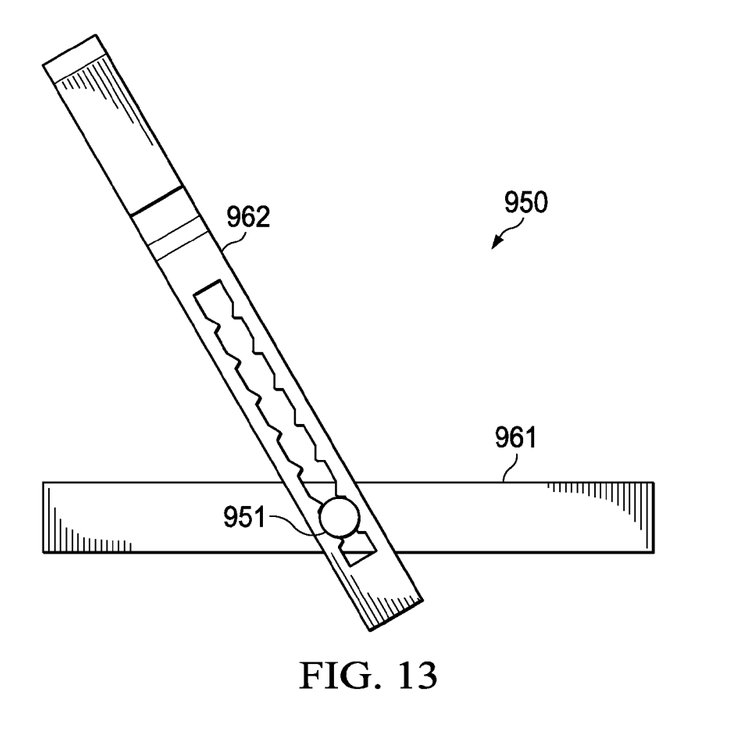
FIG. 13 is a side view of an embodiment link hinge of the mobile phone of FIG. 9.
Figure 14A:
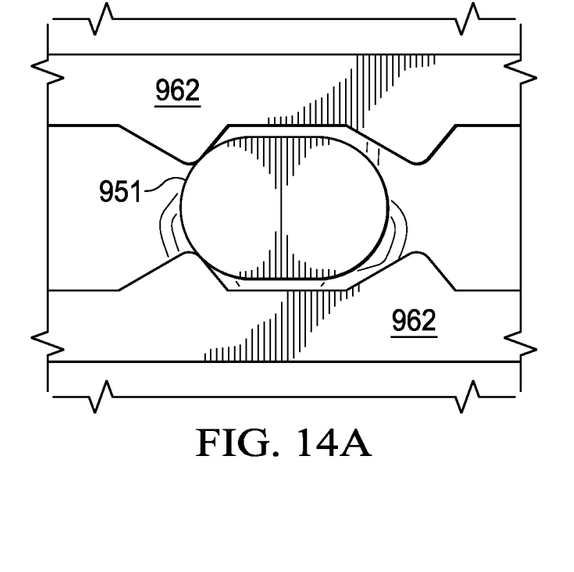
FIGS. 14A and 14B are front and back side views of a section of the link hinge of FIG. 13.
Figure 14B:
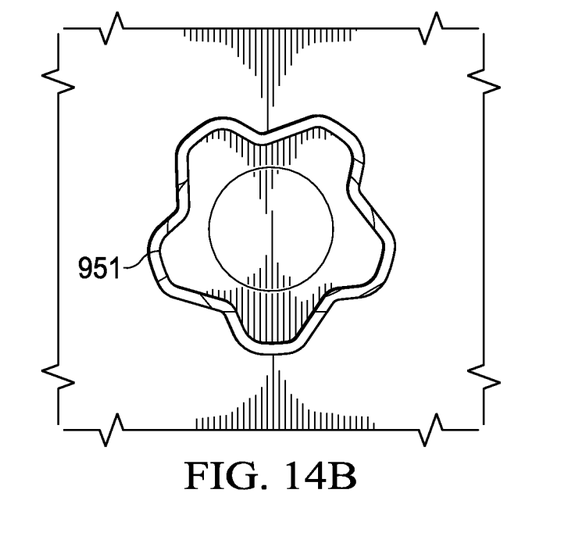

FIGS. 11A and 11B show front and back views of the mobile phone 900. The parts 922 and 921 are positioned at an angle between 90° and 180°, similar to a laptop form. At such angle positioning, the link hinges 950 expand from the second part 922 and plug in the first part 921 to support the angle positioning and lock the angle between the two parts 921 and 922. FIG. 12 is a side view of a section of the mobile phone 100 showing a link hinge 950 in the second part 922. For each link hinge 950, a spring 955 and a latch mechanism 990 is also embedded in the second part 922. A side portion of the latch mechanism 990 is exposed and accessible via a side opening in the second part 922, on each of the two opposite edges. FIG. 13 shows an embodiment of the link hinge 950, including a first hinge part 961 and a second hinge part 962 linked by a rod 951. The second hinge part 962 includes a series of holes that allow translation of the rod 951 across the second part 962 and hence the expansion of the first part 961. FIGS. 14A and 14B show front and back side views of the interface section between the first hinge part 961 and the second hinge part 962. FIG. 14A shows the shapes of the rod 951 and one of the holes 951. FIG. 14B shows the shape of the rod 951 on the other end. The shapes can be any suitable shapes that allow locking the two hinge parts 961 and 962 at an angle.

The second hinge part 962 can be pushed outside the second part 922 by operating the latch mechanism 990. The exposed side of the latch mechanism 990 can be pressed to release the second hinge part 962 inside the second part 922, which allows the spring to expand and push the second part 962 outside the second part 921. This movement exposes the holes of the second hinge part 962 and allows translating the rod 951 into the desired hole to properly extend the first part 961 and lock the angle positioning. When the first part 961 is extended, it plugs into the edge of the first part 921. The link hinge 950 is pushed back inside the second part 922, by folding the two parts 921 and 922 on each other, until the link hinge 950 is locked in by the latch mechanism 990.

Figure 15:
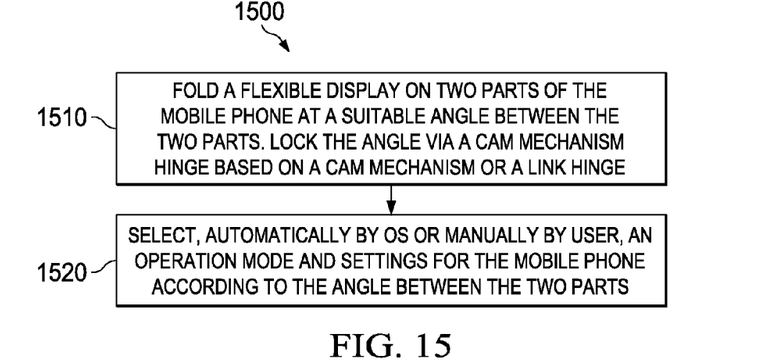
FIG. 15 illustrates a method of operation of a mobile phone with a flexible display screen according to an embodiment of the disclosure.

FIG. 15 illustrates an embodiment method 1500 for operating a mobile phone, or similar electronics device, with a flexible display screen, such as the mobile phone 100 or 900. At step 1510, a flexible display on the two parts of the mobile phone is folded manually at a suitable angle between the two parts. The angle is locked via a rotatable hinge based on a cam mechanism or a link hinge, as described above. For example, the two parts can be fully folded on one another as in FIGS. 6a and 6B, fully unfolded at 180° as in FIGS. 7A and 7B, or folded at less than 180° as in FIG. 8. At step 1520, an operation mode for the mobile phone is selected according to the angle between the two parts. For instance, the operating system (OS) of the mobile phone detects the angle between the two parts and accordingly selects a suitable operation mode. The angle can be detected via any suitable mechanism, e.g., via embedded sensors or by user input. Alternatively, the user enters a selected mode as input, such as by selecting a mode from available modes. The two approaches can be used together. For example, the OS selects a suitable mode but the user can reselect another operation mode. Each operation mode may have a designated view mode, e.g., full single view, divided view (e.g., a viewing window and a touch keyboard), or multiple window views. Each operation mode can also have suitable power settings and other feature settings.

Figure 16:
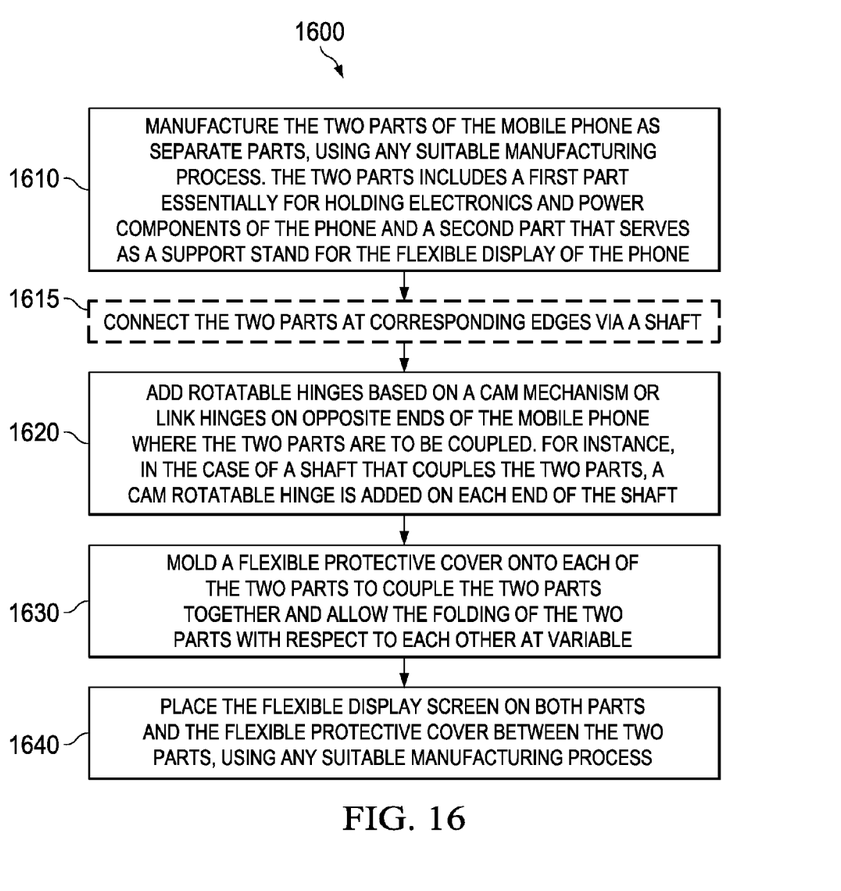
FIG. 16 illustrates a method of assembly of a mobile phone with a flexible display screen according to an embodiment of the disclosure.

FIG. 16 illustrates an embodiment method 1600 for assembling or making a mobile phone, or similar electronics device, with a flexible display screen, such as the mobile phone 100 or 900. At step 1610, the two parts of the mobile phone are made as separate parts, using any suitable manufacturing process. The two parts includes a first part essentially for holding electronics and power components of the phone and a second part serving as a support stand for the flexible display of the phone. At an optional step 1615 (shown in dashed lines), the two parts are connected at corresponding edges via a shaft. For instance, this step is used in the case of the mobile phone 100. At step 1620, rotatable hinges based on a cam mechanism or link hinges are added on opposite ends of the mobile phone where the two parts are to be coupled. For instance, in the case of a shaft that couples the two parts, a rotatable hinge is added on each end of the shaft. Alternatively, link hinges are embedded at opposite ends of the two parts, as in the case of the mobile phone 900. At step 1630, a flexible protective cover is molded onto each of the two parts to couple the two parts together and allow the folding of the two parts with respect to each other at variable angles. At step 1640, the flexible display screen is placed on both parts and the flexible protective cover between the two parts, using any suitable manufacturing process.

Figure 17:
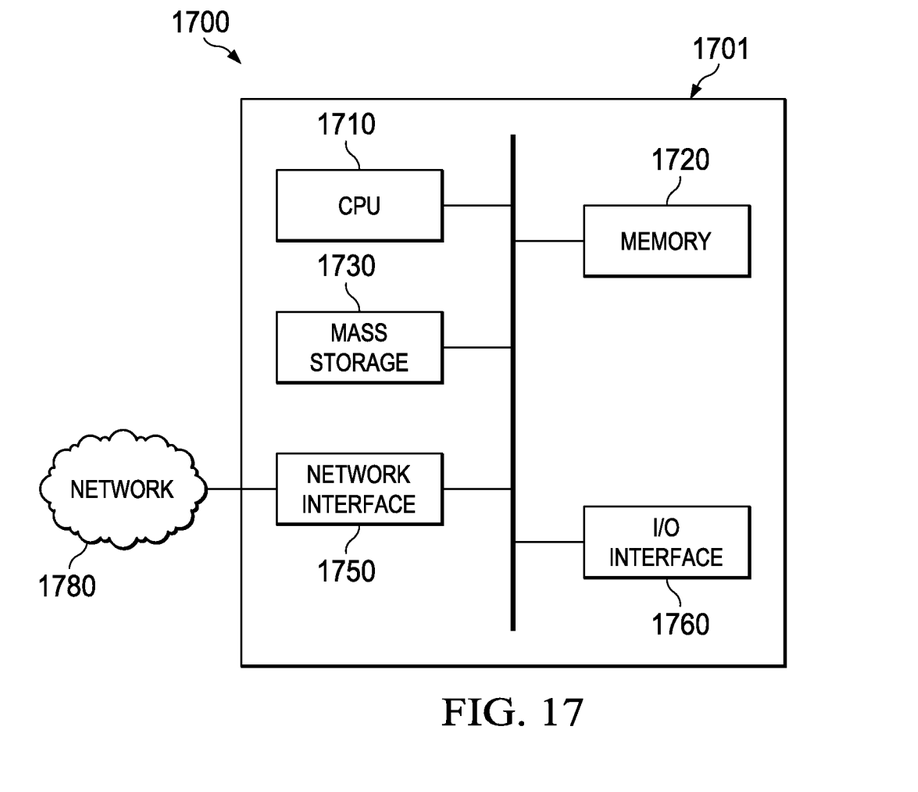
FIG. 17 is a diagram of a processing system that can be used to implement various embodiments.

Although the embodiment systems, apparatuses, and methods above are described in the context of a mobile phone, any of the embodiments can be extended to a suitable portable electronics device of similar size and form. FIG. 17 is a block diagram of an exemplary processing system 1700 that can be used to implement any of the embodiments above. For example, the processing system 1700, or at least a subset of the system 1700, is part of the mobile phone 100 or 900. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1700 may comprise a processing unit 1701 equipped with one or more input/output devices, such as a network interfaces, storage interfaces, and the like. The processing unit 1701 may include a central processing unit (CPU) 1710, a memory 1720, a mass storage device 1730, and an I/O interface 1760 connected to a bus. The bus may be one or more of any type of several bus architectures including a memory bus or memory controller, a peripheral bus or the like.

The CPU 1710 may comprise any type of electronic data processor. The memory 1720 may comprise any type of system memory such as static random access memory (SRAM), dynamic random access memory (DRAM), synchronous DRAM (SDRAM), read-only memory (ROM), a combination thereof, or the like. In an embodiment, the memory 1720 may include ROM for use at boot-up, and DRAM for program and data storage for use while executing programs. In embodiments, the memory 1720 is non-transitory. The mass storage device 1730 may comprise any type of storage device configured to store data, programs, and other information and to make the data, programs, and other information accessible via the bus. The mass storage device 1730 may comprise, for example, one or more of a solid state drive, hard disk drive, a magnetic disk drive, an optical disk drive, or the like.

The processing unit 1701 also includes one or more network interfaces 1750, which may comprise wired links, such as an Ethernet cable or the like, and/or wireless links to access nodes or one or more networks 1780. The network interface 1750 allows the processing unit 1701 to communicate with remote units via the networks 1780. For example, the network interface 1750 may provide wireless communication via one or more transmitters/transmit antennas and one or more receivers/receive antennas. In an embodiment, the processing unit 1701 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A mobile phone comprising:
a first part having a first surface and a first edge;
a second part having a second surface and a second edge;
a rotatable hinge coupling the first edge of the first part to the second edge of the second part, the rotatable hinge rotating in accordance with a cam mechanical mechanism, the rotatable hinge comprising a spring holder fixed to the first part, a hinge head fixed to the first part and comprising a protrusion with a plurality of first teeth around a circumference of the protrusion, a rotatable part between the hinge head and the spring holder, the rotatable part comprising a socket with a plurality of second teeth around a circumference of the socket, and a spring, in the spring holder, coupled to spring holder and the rotatable part, wherein the protrusion of the hinge head extends into the socket of the rotatable part such that the plurality of first teeth around the circumference of the protrusion engage with the plurality of second teeth around the circumference of the socket to form the cam mechanical mechanism; and
a continuous flexible display having a back surface disposed on the first surface of the first part and on the second surface of the second part, and having a viewing surface opposite the back surface.

2. The mobile phone of claim 1 further comprising a shaft coupled to the first edge and the second edge, and comprising the rotatable hinge and a second rotatable hinge similar to the rotatable hinge, wherein the rotatable hinge and the second rotatable hinge are positioned at opposing ends of the shaft.

3. The mobile phone of claim 2 further comprising a flexible protective cover molded to and coupling the first surface and the second surface, and placed on the shaft between the first part and the second part, wherein the continuous flexible display is disposed on the first surface, the second surface, and the flexible protective cover between the first surface and the second surface.

4. The mobile phone of claim 3 further comprising two strip springs embedded in the flexible protective cover or between the shaft and the protective flexible cover, wherein the strip springs are positioned at opposing ends of the flexible protective cover.

5. The mobile phone of claim 1 further comprising a fastener coupled to a third edge of the second part opposite to the first edge, wherein the fastener allows fastening and releasing the first part with the first part.

6. The mobile phone of claim 1, wherein the first part comprises electronics components and a battery.

7. The mobile phone of claim 1, wherein the rotatable hinge is rotatable in a range from about 0 degree to more than at least 270 degrees.

8. A mobile phone comprising:
a first part having a first surface and a first edge;
a second part having a second surface and a second edge;
a link hinge expandable from second edge of the second part, and pluggable into the first edge of the first part; and
a continuous flexible display having a back surface disposed on the first surface of the first part and on the second surface of the second part, and having a viewing surface opposite the back surface,
wherein the link hinge comprises a first hinge part extendible from the second part and pluggable into the first part, a second hinge part translatable inside and outside the second part, and a rod linking the first hinge part to the second hinge part,
wherein the second hinge part comprises a series of holes along the second hinge part, a spring coupled to the second hinge part and the second part, and a latch mechanism for locking and releasing the second hinge part, the series of holes being completely encircled by material of the second hinge part, and
wherein the rod is translatable through the series of holes.

9. The mobile phone of claim 8 further comprising a second link hinge similar to the link hinge, expandable from the second edge of the second part and pluggable into the first edge of the first part, wherein the link hinge and the second link hinge are positioned at opposing ends of the first edge and the second edge.

10. The mobile phone of claim 8 further comprising a flexible protective cover molded to and coupling the first surface and the second surface, wherein the continuous flexible display is disposed on the first surface, the second surface, and the flexible protective cover between the first surface and the second surface.

11. The mobile phone of claim 8 further comprising a fastener coupled to a third edge of the second part opposite to the first edge, wherein the fastener allows fastening and releasing the first part with the first part.

12. The mobile phone of claim 8, wherein the first part comprises electronics components and a battery.

13. The mobile phone of claim 8, wherein the link hinge is rotatable in a range from about 0 degree to more than at least 270 degrees.

14. A method of manufacturing a mobile phone, the method comprising:
forming a first body section having a first main surface and a first edge;
forming a second body section having a second main surface and a second edge;
coupling the first edge of the first body section to the second edge of the second body section with a rotatable hinge, the rotatable hinge rotating in accordance with a cam mechanical mechanism, the rotatable hinge comprising a spring holder fixed to the first body section, a hinge head fixed to the first body section and comprising a protrusion with a plurality of first teeth around a circumference of the protrusion, a rotatable part between the hinge head and the spring holder, the rotatable part comprising a socket with a plurality of second teeth around a circumference of the socket, and a spring, in the spring holder, coupled to spring holder and the rotatable part, wherein the protrusion of the hinge head extends into the socket of the rotatable part such that the plurality of first teeth around the circumference of the protrusion engage with the plurality of second teeth around the circumference of the socket to form the cam mechanical mechanism or a link hinge; and
attaching a back surface of a continuous flexible display to the first main surface of the first body section and to the second main surface of the second body section, wherein the continuous flexible display has a viewing surface opposite the back surface.

15. The method of claim 14, further comprising:
affixing a flexible protective cover to the first main surface and the second main surface, the flexible protective cover molded to the first main surface and the second main surface, wherein the continuous flexible display is disposed on the first main surface, the second main surface, and the flexible protective cover between the first main surface and the second main surface.

16. The method of claim 14, further comprising:
coupling a fastener to a third edge of the second body section opposite to the first edge, wherein the fastener allows fastening and releasing the first body section with the first body section.

17. A method of manufacturing a mobile phone, the method comprising:
forming a first body section having a first main surface and a first edge;
forming a second body section having a second main surface and a second edge;
coupling the first edge of the first body section to the second edge of the second body section with a link hinge; and
attaching a back surface of a continuous flexible display to the first main surface of the first body section and to the second main surface of the second body section, wherein the continuous flexible display has a viewing surface opposite the back surface,
wherein the link hinge comprises a first hinge part extendible from the second body section and pluggable into the first body section, a second hinge part translatable inside and outside the second body section, and a rod linking the first hinge part to the second hinge part,
wherein the second hinge part comprises a series of holes along the second hinge part, a spring coupled to the second hinge part and the second body section, and a latch mechanism for locking and releasing the second hinge part, the series of holes being completely encircled by material of the second hinge part, and
wherein the rod is translatable through the series of holes.

18. The method of claim 17, further comprising:
affixing a flexible protective cover to the first main surface and the second main surface, the flexible protective cover molded to the first main surface and the second main surface, wherein the continuous flexible display is disposed on the first main surface, the second main surface, and the flexible protective cover between the first main surface and the second main surface.

19. The method of claim 17, further comprising:
coupling a fastener to a third edge of the second body section opposite to the first edge, wherein the fastener allows fastening and releasing the first body section with the first body section.

20. The method of claim 17, wherein the link hinge is rotatable in a range from about 0 degree to more than at least 270 degrees.

* * * * *

UNITED STATES PATENT AND TRADEMARK OFFICE
CERTIFICATE OF CORRECTION

PATENT NO. : 9,294,597 B2  
APPLICATION NO. : 14/163317  
DATED : March 22, 2016  
INVENTOR(S) : Hui Tan et al.

Page 1 of 1

It is certified that error appears in the above-identified patent and that said Letters Patent is hereby corrected as shown below:

In the Claims

In Col. 10, line 17, claim 14, delete "or a link hinge".

Signed and Sealed this  
Seventh Day of June, 2016

Michelle K. Lee  
*Director of the United States Patent and Trademark Office*